June 25, 1963   B. R. JUNGERWIRTH   3,094,800
DISPLAY CONSTRUCTIONS
Filed Oct. 25, 1957
2 Sheets-Sheet 1
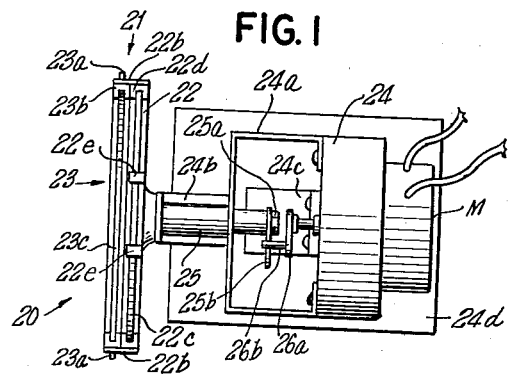
FIG. 1
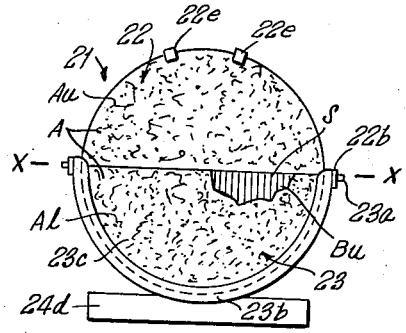
FIG. 3
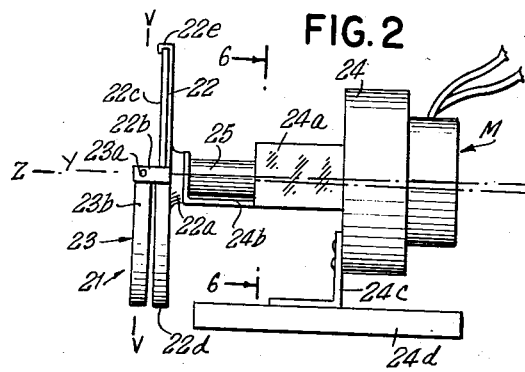
FIG. 2
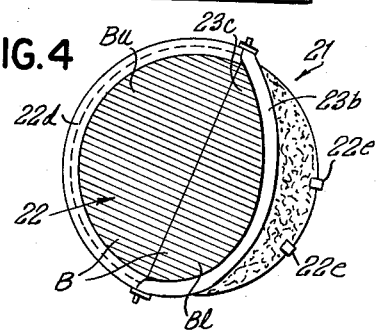
FIG. 4
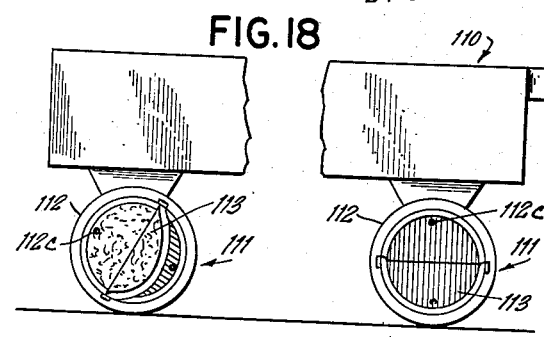
FIG. 18
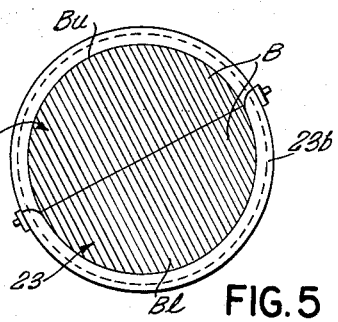
FIG. 5
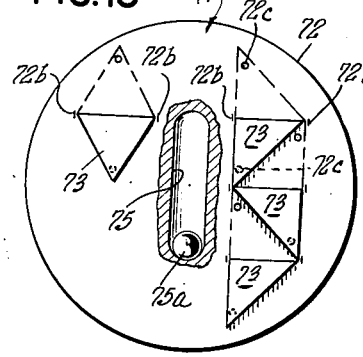
FIG. 13
FIG. 14
FIG. 6
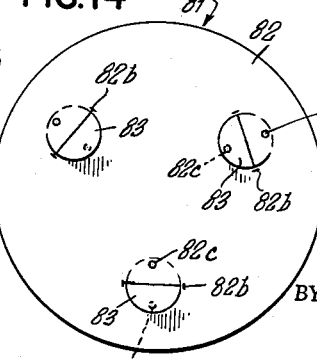
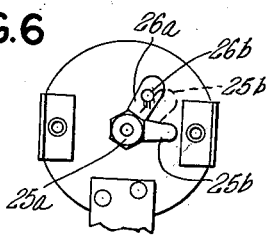
INVENTOR.
BERNARD R. JUNGERWIRTH
BY
Barnett & Barnett
ATTORNEYS

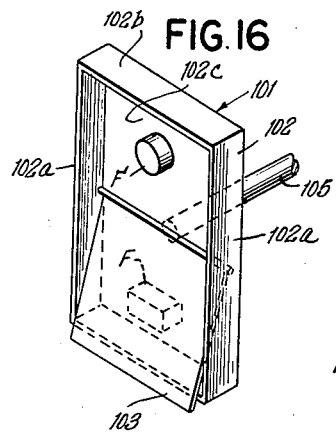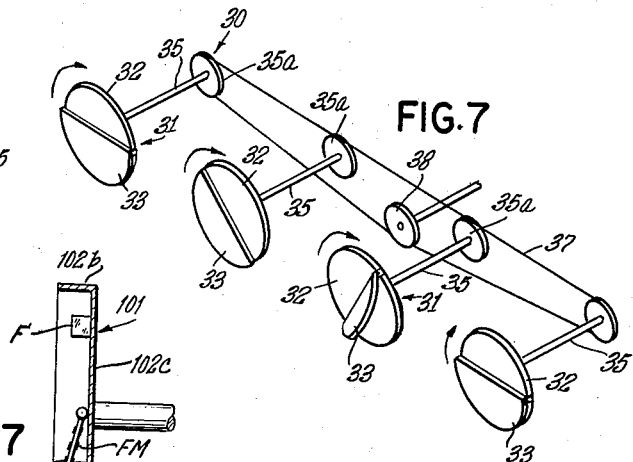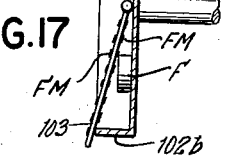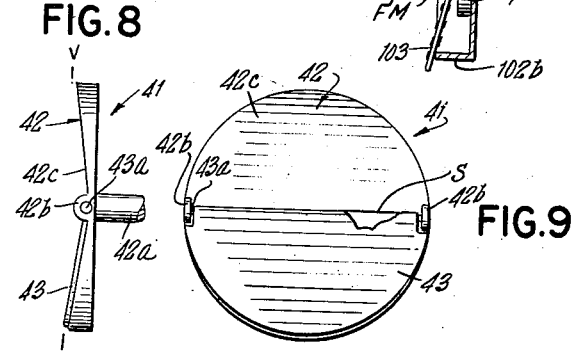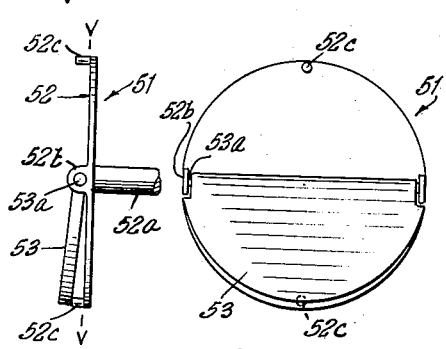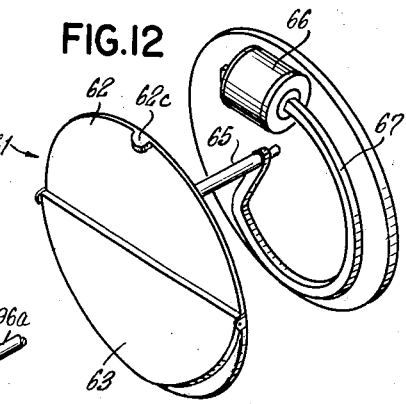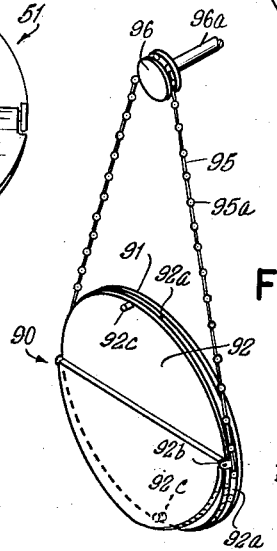

United States Patent Office 3,094,800
Patented June 25, 1963

3,094,800
DISPLAY CONSTRUCTIONS
Bernard R. Jungerwirth, 97—37 63rd Road,
Rego Park 74, N.Y.
Filed Oct. 25, 1957, Ser. No. 692,378
11 Claims. (Cl. 40—33)

This invention relates to display devices and more particularly is directed to mechanisms mounting a plurality of display fields and exposing the fields consecutively to view for use in advertising displays, visual educational aids and toys for children.

Among the objects of the invention is to provide display devices utilizing a novel manner of mounting and arranging a plurality of display fields and driving mechanisms for exposing the fields consecutively to view, to integrate such display devices with a wide variety of other units, such as advertising signs, educational aids and toys, which display devices shall comprise few and simple parts, inexpensive to manufacture and readily adaptable to the various intended uses, which display devices shall include driving mechanisms for imparting movement to signs for improving their attention attracting capabilities and, where desired, such display devices shall provide sound effects as a further attention directing device, which signs shall enable wares and written matter with respect thereto to be displayed in a novel and attractive manner, which display devices shall readily be adaptable for use with various different types of driving mechanisms to render a wide range of novel results in the visual advertising medium, and which shall be practical and efficient to a high degree in use.

Other objects of the invention will in part be obvious and in part hereinafter pointed out.

The invention accordingly consists of features of constructions, combination of elements and arrangement of parts which will be exemplified in the constructions hereinafter disclosed, the scope of the application of which will be indicated in the claims following.

The invention accordingly consists of features of constructions, combination of elements and arrangement of parts which will be exemplified in the constructions hereinafter disclosed, the scope of the application of which will be indicated in the claims following.

In the accompanying drawing in which various illustrative embodiments of the invention are shown:

FIGS. 1, 2 and 3 are top plan, side and front elevational views, respectively, showing a drop leaf alternating field display unit mounted as an advertising sign embodying the invention connected for intermittent actuation by a constant speed motor, FIG. 3 showing one of the display fields in upright position when the display unit is at rest with a portion of the drop leaf broken away to show underlying elements.

FIG. 4 is a front elevational view of the display unit showing the sign rotated clockwise through an angle of approximately 120 degrees from the position shown in FIG. 3 with the drop leaf member in the process of flipping over into an alternate position to expose a second display field.

FIG. 5 is a front elevational view similar to FIGS. 3 and 4 but showing the drop leaf member in its alternate position after completion of the flip-over exposing the second display field, the sign being in the process of righting itself by overrunning the constant speed motor drive.

FIG. 6 is a sectional view taken along line 6—6 in FIG. 2 showing details of the intermittent drive connection between the constant speed motor and a lever arm of the display unit, the lever arm being shown in full lines in a rest position after the sign has completed an overrunning advancement of the motor drive and is in the upright position shown in FIGS. 2 and 3, the lever arm being shown in broken lines engaged by the motor crank lever pin illustrating its approximate location when the display unit is in the position shown in FIG. 4 as the flipping over of the drop leaf begins to cause acceleration of the rate of rotation of the display unit.

FIG. 7 is a diagrammatic showing in perspective of another application of the invention as a sign utilizing a plurality of display units arranged for staggered flip-over.

FIGS. 8 and 9 are side and front elevational views, respectively, of a modified display unit embodying the invention.

FIGS. 10 and 11 are side and front elevational views, respectively, showing still another modified form of display unit.

FIG. 12 is a perspective view of a slightly modified display unit embodying the invention driven for oscillating movement by a solenoid type motor.

FIG. 13 is a front elevational view of another modified construction of advertising sign embodying the invention utilizing a plurality of drop leaves to vary an over-all display motif, a central portion of the sign being broken away to show a ball and track serving as a self-righting device.

FIG. 14 is a front elevational view of a sign somewhat similar to the sign of FIG. 13 but in which the multiple drop leaves are arranged with their respective pivotal axes in angular relation to each other to stagger the flip-overs.

FIG. 15 is a front perspective view of still another modification of advertising or display sign utilizing a pulley and belt as a suspension support and drive for the display unit.

FIGS. 16 and 17 are front perspective and side elevational views, respectively, of still another modified form of display unit having a box or frame for displaying articles of merchandise in combination with written advertising matter, FIG. 17 showing the display unit in the alternate position, and FIG. 18 is a fragmentary side elevational view of a toy showing utilization of the display unit embodying the invention as wheels.

Referring in detail to the drawing, 20 generally denotes an advertising sign constructed to embody the invention comprising a drop leaf alternating display unit 21 mounted for rotation on a substantially horizontal shaft 25 driven by a suitable electric motor M. Any practical supporting means for shaft 25 may be employed and as here shown motor housing 24 carries U-shaped bracket 24a having an extension 24b and is supported by L-shaped bracket 24c on base member 24d.

Display unit 21 may be of any suitable peripheral contour and is shown in a preferred form in FIGS. 1 to 5, inclusive, to be circular and to have a rear display supporting member 22 formed with centrally located hub 22a on the rear side thereof into which shaft 25 is suitably attached as by a pressed fit. Semicircular drop leaf member 23 is suspended on the front side of supporting member 22 from diametrically positioned pivot means of any suitable construction here shown as eyelets 22b projecting from supporting member 22 engaged by pins 23a extending in axial alignment from drop leaf member 23. Eyelets 22b are located to receive pins 23a for pivoting drop leaf member 23 on an axis X—X which extends diametrically with respect to the circular contour of display unit 21.

Two different display fields, that is, motifs, patterns or subjects A and B may be carried by unit 21 for alternate viewing, each motif being divided into an upper half $Au$ and $Bu$ and a lower half $Al$ and $Bl$, respectively. As is clear from FIGS. 3, 4 and 5, upper display motif halves A*u* and B*u* are oppositely arranged on support member 22, that is, the bottom margins or edges of the respective upper halves lie adjacent each other defining a diametric line of separation S, the latter being parallel to the pivotal axis X—X of drop leaf member 23, as shown in FIG. 3. It is contemplated that motif halves A*u* and B*u* be provided on supporting member 22 in any suitable manner, for example, as by being directly imprinted, drawn or painted thereon or, as indicated in FIGS. 1 and 2, by being carried on an interchangeable display card 22*c* which is removably secured against the front face of member 22 by semicircular rim flange 22*d* and suitable tabs 22*e*.

Likewise, lower motif halves A*l* and B*l* are carried on opposite sides of drop leaf member 23 with the top margins thereof coinciding with said axis X—X. As in the case of support member 22, drop leaf member 23 may be provided as a unitary structure with lower motif halves A*l* and B*l* suitably imprinted on opposite sides thereof or, as shown in FIGS. 1 and 2, drop leaf member 23 may comprise a semicircular channel 23*b* seating an interchangeable display card 23*c* on which lower motif halves A*l* and B*l* are arranged so that the exposed lower half corresponds to its respective exposed upper half carried on base member 22 to form one of the fields or motifs A or B as a complete, exposed display.

Display unit 21 is rotatably supported in a substantially vertical relation by shaft 25, the latter being suitably journaled for rotation in bracket 24*a* and extension 24*b*. Shaft 25 may be driven at a desired uniform speed by any suitable power motor in the well understood manner or, as seen in FIGS. 1 and 6, may be loosely connected to motor M by an intermittent overrunning drive for the purpose hereinafter more fully described. To this end, motor output drive shaft 26 is terminated by a crank lever 26*a* from which eccentric pin 26*b* extends to engage and drive lever arm 25*b* suitably mounted to rotate with free end 25*a* of shaft 25 opposite display unit 21 by bolt 25*c*.

It will be observed that the axis of rotation Y—Y of shaft 25 and display unit 21 is slightly inclined with respect to the horizontal plane Z—Z which, in turn, has the effect of inclining forwardly rear display supporting member 22. This angle of inclination serves to position the center of gravity of drop leaf member 23 sufficiently forwardly of vertical plane V—V indicated in FIG. 2 passing through pivotal axis X—X to ensure flipping over of drop leaf member 23 as display unit 21 rotates through 180 degrees.

The operation of advertising sign 20 will now be apparent. After constructing and assembling the parts as described above and positioning display card 22*c* against supporting member 22 held in position by semicircular flange 22*d* and tabs 22*e* with upper motif halves A*u* and B*u* located so that diametrical line of separation S therebetween aligns with pivotal axis X—X and interchangeable display card 23*c* is positioned in semicircular channel 23*b* locating lower motif halves A*l* and B*l* for proper exposure to view when the corresponding upper half is exposed to provide a complete motif, advertising sign 20 is ready for use. Motor M, which is contemplated to be of the constant speed type and include suitable reduction gearing, is connected to an electric power source. Assuming output drive shaft 26 to be turning in a clockwise direction, as seen in FIG. 6, and at a constant speed, as crank lever 26*a* rotates with shaft 26, pin 26*b* engaging lever arm 25*b* rotates shaft 25 and turns display unit 21 on its axis of rotation Y—Y in the same direction. As is clear from FIGS. 3, 4 and 5, display unit 21 will be rotated through approximately 120 degrees of arc from the position shown in FIG. 3 to that shown in FIG. 4, that is, until the center of gravity of drop leaf member 23 which is now above pivotal axis X—X shifts forwardly of vertical plane V—V causing drop leaf member 23 to flip over to the position shown in FIG. 5. As this occurs, the shift in weight of drop leaf member 23 causes display unit 21 in its clockwise rotation to overrun the speed of output drive shaft 26 so that display unit 21 quickly assumes an upright position in which pivotal axis X—X is substantially horizontal. Display unit 21 will then remain stationary in such upright position until crank lever 26*a* and pin 26*b* catch up and again engage lever arm 25*b*. At this point, output drive shaft 26 has completed one-half a revolution or 180 degrees of arc and in the next half revolution or 180 degrees of arc a second flipping or change of design motif will be accomplished. Thus, during each complete revolution of drive shaft 26, display unit 21 will change from motif A shown in FIG. 3 to motif B shown in FIG. 5 and back to motif A. The provision of an intermittent overrunning drive between the motor M and shaft 25 contributes a desirable, although not necessary, time interval within which display unit 21 remains alternately in a stationary upright position. A speed of rotation of between two and eight r.p.m. has been found to render satisfactory results although faster and slower speeds may be found useful for obtaining special effects. Motifs A and B may be periodically changed as desired by stopping the motor M and replacing display cards 22*c* and 23*c* with others. Also, unit 21 may be designed for carrying adhesive backed overlays bearing motifs for interchangeable attachment in the well understood manner.

A plurality of display units may be combined into a single advertising display, generally designed 30 and shown diagrammatically in FIG. 7 to comprise a plurality of display units 31 arranged to be driven in unison by a chain or belt 37 or other suitable means from a drive pulley 38 connected to a power source (not shown). Display units 31 may all be similar to display unit 21, each having a supporting member 32 mounted for rotation on a shaft 35 and a pivoted drop leaf member 33. Shafts 35, each terminated with a pulley 35*a*, are driven in unison by said belt 37. In the illustration in FIG. 7 of advertising display 30, display units 31 are arranged for staggered changing or flip-over of drop leaf members 33, that is, the pivotal axes of members 33 are in angular relation to each other. It is also contemplated that display units 31 may be arranged for simultaneous flip-over of drop leaf members 33, in which case said pivotal axes are arranged parallel to each other. Although the diagrammatic showing in FIG. 7 provides for rotation of display units 31 at a uniform rate, if desired, an overrunning drive mechanism similar to that illustrated in FIG. 6 may be interposed along each of the shafts 35 to provide an intermittent rotation and a rest interval for each unit 31 similar to that described above in relation to advertising sign 20.

Where the axis of rotation Y—Y of a display unit is preferred to be disposed on the horizontal instead of at an angle to the horizontal as shown in FIG. 3, other means may be provided for positioning the center of gravity of the drop leaf member forwardly of the vertical plane V—V to ensure the flip-over action. Such other means are incorporated in display units 41 and 51 shown in FIGS. 8, 9 and 10, 11, respectively.

Display unit 41 may be constructed with supporting member 42, eyelets 42*b* and drive shaft 42*a* formed as a unitary structure, such as, by molding of a suitable plastic material or by die casting in metal. The front side of supporting member 42 is formed with semicircular sections 42*c* sloping rearwardly from opposite edges of supporting member 42 to the diametrical line of separation S. Drop leaf member 43 may also be molded as a single unit with pivot pins 43*a* arranged to snap into eyelets 42*b* and will be seen to support member 43 against said sloping semicircular sections 42*c* at a slight angle to the vertical plane V—V.

Display unit 51 may also be formed with supporting member 52, eyelets 52*b* and shaft 52*a* as a unitary structure but the front surface of supporting member 52 may be flat and when mounted for operation will extend parallel to a vertical plane V—V. Supporting member 52 will carry along the top and bottom edges thereof forwardly protruding pins or bosses 52c against which the bottom edge of drop leaf member 53 rests, said pins 52c serving to dispose member 53 at a slight angle to the vertical plane V—V.

Display units 41 and 51, when fitted with design motifs A and B split into upper and lower halves Au, Bu, Al and Bl and arranged on support members 42 and 52 and drop leaf members 43 and 53 will operate in the same manner as described above in reference to display unit 21. The angular disposition of drop leaf members 43 and 53 with respect to vertical plane V—V will position the centers of gravity thereof forwardly of their respective pivotal axes to cause a flip-over of members 43 and 53 to occur on each half rotation of members 42 and 52 on their horizontally disposed axes, respectively.

In practicing the invention, an oscillatory action may be imparted to the display unit to change the display field or motif. FIG. 12 shows display unit 61 arranged for such oscillatory movement by a conventional solenoid type motor 66 having an arcuate shaped armature 67 which is connected to drive shaft 65 of display unit 61. The latter may be of any construction hereinbefore described and is shown to comprise support member 62 carrying bosses 62c and pivoted drop leaf member 63 all substantially similar to the corresponding parts in display unit 51. In operation, by oscillating display unit 61 on its horizontal axis through a half revolution, that is, 180 degrees, alternate showing of two display motifs carried on support member 62 and drop leaf member 63 is accomplished.

Instead of utilizing a plurality of display units in the manner shown in FIG. 7 and described above, a single display unit may be arranged to carry a plurality of drop leaf members to provide still another type of novel display. Display units 71 and 81 shown in FIGS. 13 and 14, respectively, are examples of this version of the invention. Display unit 71 may comprise a supporting member 72 of any desired peripheral contour and carries on the front face thereof pairs of eyelets 72b, each pair pivotally supporting a drop leaf member 73. The latter may also be of any desired peripheral contour and are arranged to alternately cover a predetermined surface area of supporting member 72. In FIG. 13 each of the drop leaf members 73 are shown triangular in shape and may have different display material on opposite sides thereof to blend with the over-all display carried by supporting member 72. In order to assure the flip-over action of the drop leaf member 73, pairs of protruding bosses 72c are provided to extend from the front surface of supporting member 72, each pair being located to dispose one of the drop leaf members 73 at an incline to the vertical for positioning the center of gravity of each member 73 forwardly of the pivotal axis in the manner described above in reference to display units 41 and 51.

Display unit 71 may be driven at a constant uniform rate by a suitable motor, may be attached for oscillation by a solenoid or other oscillatory device or may be connected for intermittent rotary movement in a manner similar to display unit 21. When the latter is utilized, support member 72 may be fitted with a self-righting device which may be in the form of a diametrically extending elongated closed track 75 containing a freely movable weighted ball 75a. As shown in FIG. 13, track 75 is positioned to extend at right angles to the pivotal axes of drop leaf members 73 so that the shifting of ball 75a from one end of track 75 to the other as support member 72 rotates will cause the latter to overrun the driven speed thereof and right itself and remain stationary until the positive drive again takes over to effect the next change.

Display unit 81 may, like unit 71, have a plurality of pairs of eyelets 82b extending from the front surface of support member 82, but such eyelets 82b may be arranged to support the respective drop leaf members 83 with their pivotal axes in angular relation to each other. With this angular arrangement of drop leaf members 83, display unit 81 is rotated at a uniform constant speed by a positive drive to consecutively flip-over drop leaf members 83 instead of simultaneously as in the arrangement shown in FIG. 13. Support member 82 will also carry a pair of pins or bosses 82c for each drop leaf member 83.

A novel and attractive advertising display 90 is shown in FIG. 15 to comprise display unit 91 suspended by chain 95 for rotary motion from sprocket or pulley 96 mounted on drive shaft 96a. The periphery of supporting member 92 is provided with a groove 92a which may be formed with properly spaced recesses to seat the beads 95a of chain 95 in non-slip engagement. In all other respects, display unit 91 having eyelets 92b, positioning pins 92c and drop leaf member 93 may be constructed to operate in a manner similar to display unit 51. Likewise, drive shaft 96a may be connected for continuous uniform rotation to a suitable power source (not shown) or may be arranged for intermittent rotation by having interposed between drive shaft 96a and the power source an overrunning drive connection similar to that shown in FIG. 6 to operate display 90 in the same manner as described above in reference to display unit 21. It will thus be apparent that advertising display 90 is not only attractive and modern in design but also is useful where display space is lacking in depth and can be utilized as a two-sided display by duplicating drop leaf member 93 on the rear side thereof.

Another embodiment of the invention is illustrated in FIGS. 16 and 17 as display unit 101 having a supporting member 102 formed as an open faced box with vertical sides 102a and top and bottom horizontal sides 102b extending forwardly from vertically extending rear side 102c. The latter is attached to a supporting shaft 105 for rotating display unit 101. Drop leaf member 103 is pivoted to the mid-portion of opposite vertical sides 102a adjacent rear side 102c, dividing box 102 into equal halves and is sized to extend beyond horizontal sides 102b to assume a desired incline to the vertical ensuring proper flip-over operation. Each half section of box 102 may be constructed to carry an article of merchandise or facsimile F for display, drop leaf member 103 having on each side thereof an advertising message FM relating to and being visible with its respective article of merchandise F.

Display unit 101 may be driven preferably for intermittent rotation similar to display unit 21 or, if desired, it may also be connected for oscillatory movement in a manner similar to display unit 61. It is also contemplated that a display unit similar to any of those shown in the drawings and described above be arranged for the drop leaf member to carry the merchandise and the supporting member the message.

FIG. 18 shows still another adaptation of display units embodying the invention wherein the latter serve as wheels for a pull toy 110 or the like article. Pull toy 110 may be of any desired construction here shown as a wagon having a pull handle 110a and four wheels 111. The latter are modified display units each comprising a ground engaging circular supporting member 112 pivotally mounting drop leaf member 113. As is clear from the drawings, ground engaging member 112 may have a greater radius than drop leaf member 113 and carry suitable projecting bosses or pins 112c located to engage and properly incline drop leaf member 113 to the vertical for gravity operation in the manner hereinbefore described in reference to display unit 51. Any two designs suitable for a child's toy may be carried for alternate exposure to view by each wheel 111. Each drop leaf member 113 may also be weighted and bosses 112c formed of a suitable material to accentuate the sound of the drop leaf members 113 striking thereagainst on each flip-over. Wheels 111 may be arranged to provide either simultaneous or staggered flip-over and will serve to contribute both visual and aural interest to pull toy 110.

The above described display units embodying the invention may be utilized in educational toys for children. For example, a question and answer game may be constructed with a plurality of display units similar to units 21, 41 or 51 each carrying a question as display motif A and the answer as motif B, or motif A may be the picture of an object or animal and motif B the corresponding word therefor. Any suitable means may be utilized for selectively and separately rotating or oscillating the units. This type of toy provides interest for small children in its mode of operation by satisfying their urges to operate things by buttons and levers in addition to the interest in the subject matter of the questions and answers.

The terms "substantially vertical" and "substantially vertical plane" as used in the claims are to be understood to include the slight incline of display card 22c in unit 21 and of semicircular sections 42c of display unit 41; likewise "display motif" includes patterns, colors, designs, pictorial representations, words and descriptive matter and articles of merchandise or facsimiles thereof which may be used in any combination to constitute display fields A and B.

It will also be understood that where bosses or pins are used to incline the drop leaf members with respect to the supporting members, for example, in display units 51, 61, 71, 81 and 91, such bosses 52c, 62c, 72c, 82c and 92c may be attached to extend from opposite sides of their respective drop leaf members 53, 63, 73, 83 and 93 instead of in the manner shown.

It is thus seen that there are provided improved display unit constructions and their incorporation in advertising displays, visual educational toys and pull toys whereby the several objects of this invention are achieved and which are well adapted to meet the conditions of practical use.

As various possible embodiments might be made of the above invention and as various changes might be made in the embodiments above set forth, it is to be understood that all matters herein set forth or shown in the accompanying drawings are to be interpreted as illustrative and not in a limiting sense.

Having thus described my invention, I claim as new and desire to secure by Letters Patent:

1. A display unit for exhibiting a plurality of display motifs in sequence, comprising a display supporting member having a front face carrying display material mounted for rotation in a substantially vertical plane, a drop leaf member with opposite surfaces thereof having display material related to said supporting member display material, said drop leaf member being pivotally mounted on said supporting member to alternately overlie predetermined areas of the display material on said front face on rotation of said supporting member, a relatively constant speed power drive means engaging said display supporting member for rotation in one direction on an axis substantially normal to the plane of said front face, means for locating a center of gravity of said drop leaf member to effect a flip-over by the latter to a depending position on each one-half rotation of said supporting member, an overrunning drive connection interposed between said power drive means and said supporting member imparting intermittent rotation to the supporting member, and weight means for adding impetus to the rotation of said supporting member to overrun said drive means for righting the display unit and providing a dwell period of said intermittent rotation with said supporting member in an upright position.

2. The display unit defined in claim 1 in which said weight means includes the weight of the drop leaf member which adds said impetus when pivoting to said depending position.

3. The display unit defined in claim 1 in which said weight means includes an elongated closed track carried by said supporting member and a weight mounted in said track for free reciprocation therein.

4. The display unit defined in claim 1 in which an additional drop leaf member is mounted on said supporting member to alternately overlie other predetermined areas of said front face.

5. The display unit defined in claim 1 in which an additional drop leaf member is mounted on said supporting member to alternately overlie other predetermined areas of said front face, said first mentioned and additional drop leaf members having pivotal axes arranged in parallel relation to simultaneously pivot from one of said overlying positions to the other.

6. A display unit for exhibiting a plurality of display motifs in sequence, comprising a display supporting member having a front face carrying display material mounted for rotation in a substantially vertical plane, a drop leaf member having opposite surfaces having display material related to said supporting member display material pivotally mounted on said supporting member to alternately overlie predetermined areas of the display material on said front face on rotation of said supporting member, a relatively constant speed power drive means engaging said display supporting member for rotation in one direction on an axis substantially normal to the plane of said front face, means for locating a center of gravity of said drop leaf member to effect a flip-over by the latter to a depending position on each one-half rotation of said supporting member, an overrunning drive connection interposed between said power drive means and said supporting member, said pivoting of the drop leaf member to said depending position adding impetus to the rotation of said supporting member to overrun said drive means for righting the display unit and providing a stationary time interval therefor.

7. The display unit defined in claim 6 in which said center of gravity locating means includes the disposition of the axis of rotation at an angle to the horizontal to incline said rear supporting member surface to the vertical.

8. The display unit defined in claim 6 in which said center of gravity locating means includes means carried by said supporting member to dispose said drop leaf member at an incline to said vertical plane.

9. The display unit defined in claim 6 in which said center of gravity locating means includes means co-acting between said supporting member and said drop leaf member to incline the latter in its said overlying positions at a slight angle to said front facing surface.

10. The display unit defined in claim 6 in which said display supporting member is formed as an open face box having forwardly projecting sides, said front face display material constituting samples of merchandise mounted in the box, said drop leaf member being pivoted to said sides and dividing said box into substantially equal halves, the latter constituting said predetermined areas.

11. The display unit defined in claim 6 in which said center of gravity locating means includes hemi-sections formed in said front face of said supporting member, said sections sloping rearwardly from opposite edges of said supporting member to a center line thereof, said drop leaf member being pivoted on an axis aligned with said center line for disposing said drop leaf member at an incline to said vertical plane.

References Cited in the file of this patent

UNITED STATES PATENTS

| | | |
|---|---|---|
| 470,034 | Belknap | Mar. 1, 1892 |
| 1,645,133 | Ginger | Oct. 11, 1927 |
| 2,364,786 | Hall | Dec. 12, 1944 |
| 2,482,886 | Van Gieson | Sept. 27, 1949 |
| 2,528,122 | Drews | Oct. 31, 1950 |
| 2,839,855 | Palmer et al. | June 24, 1958 |